United States Patent [19]

Zieren et al.

[11] Patent Number: 4,939,609
[45] Date of Patent: Jul. 3, 1990

[54] VERTICAL RECORDING HEAD WITH THIN FILM POLE ON NON-MAGNETIC BLOCK

[75] Inventors: Victor Zieren; Steven B. Luitjens, both of Eindhoven, Netherlands

[73] Assignee: U.S. Philips Corporation, New York, N.Y.

[21] Appl. No.: 854,209

[22] Filed: Apr. 21, 1986

[30] Foreign Application Priority Data

Apr. 26, 1985 [NL] Netherlands ............... 8501200

[51] Int. Cl.⁵ .................................... G11B 5/127
[52] U.S. Cl. .................... 360/125; 360/122; 360/123
[58] Field of Search ........... 360/110, 122, 123, 125, 360/120

[56] References Cited

U.S. PATENT DOCUMENTS

| | | | |
|---|---|---|---|
| 4,383,284 | 5/1983 | Isshiki | 360/125 |
| 4,390,916 | 6/1983 | Chow et al. | 360/123 X |
| 4,635,153 | 1/1987 | Shimamura et al. | 360/110 X |
| 4,672,494 | 6/1987 | Furuya et al. | 360/125 |
| 4,675,765 | 6/1987 | Segawa et al. | 360/125 X |

FOREIGN PATENT DOCUMENTS

| | | | |
|---|---|---|---|
| 0178612 | 10/1984 | Japan | 360/125 |
| 0163215 | 8/1985 | Japan | 360/110 |

*Primary Examiner*—Robert S. Tupper
*Assistant Examiner*—Andrew L. Sniezek

[57] ABSTRACT

Magnetic head for use in vertical recording has a main magnetic pole of a thin film of soft magnetic material enclosed between two protective blocks together constituting the body of the magnetic head. One protective block includes a magnetic part and a non-magnetic part, the latter extending from the boundary surface of the two parts up to the contact surface between the main pole and a magnetic recording medium. A channel provided at the boundary surface in the magnetic part of the protective block causes a part constituting an auxiliary magnetic pole and adjoining the main magnetic pole to be separated from a part constituting the return path for the magnetic flux from the main pole, a winding embracing the main pole and the auxiliary pole being wound through the channel. The other protective block consists entirely of a non-magnetic material and has a polished surface facing the one protective block, while the main pole is provided on the polished surface.

2 Claims, 2 Drawing Sheets

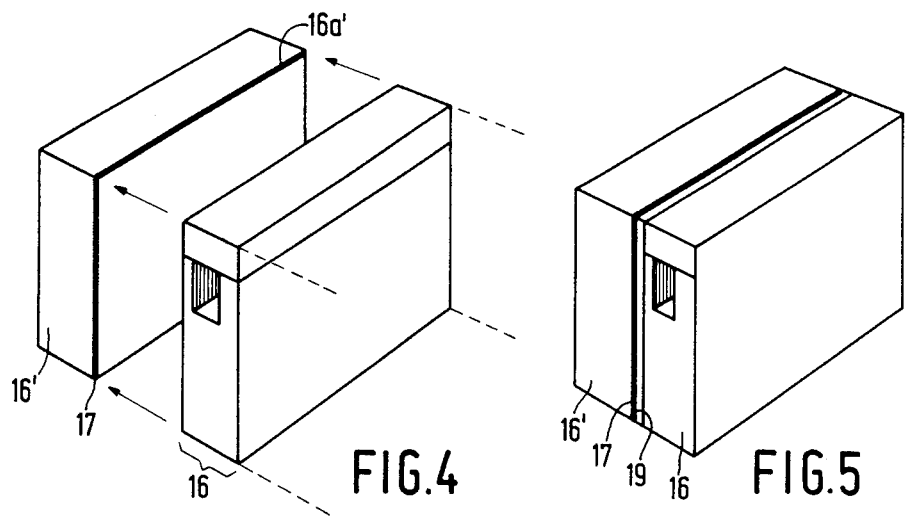
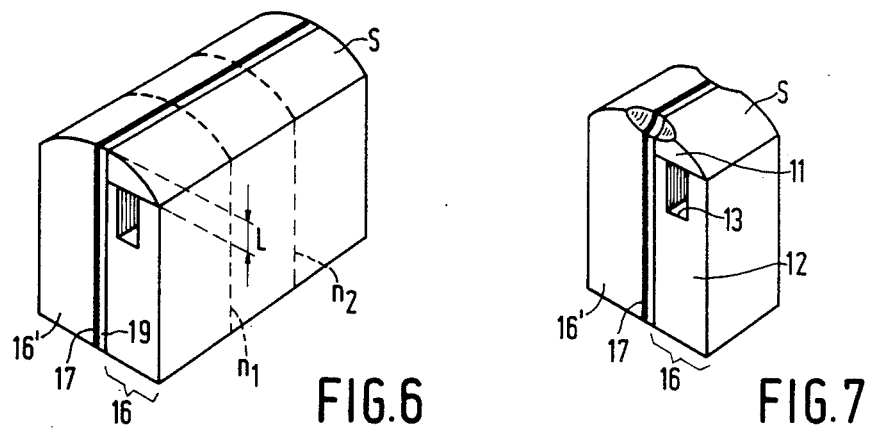
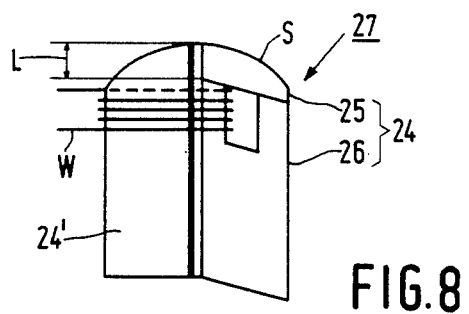

VERTICAL RECORDING HEAD WITH THIN FILM POLE ON NON-MAGNETIC BLOCK

BACKGROUND OF THE INVENTION

The invention relates to a magnetic head for use in vertical recording. The heading has a contact surface for a magnetic recording medium and a main magnetic pole of a thin film of soft magnetic material extending up to the contact surface and enclosed between first and second protective blocks together constituting the body of the magnetic head. The first protective block consists of a magnetic part and a non-magnetic part, the latter extending from the boundary surface of the two parts up to the contact surface. A channel provided at the boundary surface in the magnetic part causes a part constituting an auxiliary magnetic pole and adjoining the main magnetic pole to be separated from a part consituting the return path for the magnetic flux from the main pole, a winding embracing the main pole and the auxiliary pole being wound through the channel.

In the art of short wavelength magnetic recording it is known that vertical recording (that is to say, magnetisation in the direction of thickness of the magnetic tape-)—is advantageous over recording in the longitudinal direction or the direction of movement of the magnetic tape. The reason is that the demagnetizing field within the magnetic layer increasing if the wavelength of the recording signal is decreased in the case of recording in the longitudinal direction, whereas this field decreases in the case of vertical recording.

Various constructions have been proposed for the magnetic head for vertical recording. If ideal magnetization is to be obtained in vertical recording, the main component of the magnetic field from the magnetic head should be as nearly as possible at right angles to the magnetic recording medium.

A previously proposed magnetic head for vertical recording is known DE-A-3421083 and comprises a main magnetic pole of a thin film of soft magnetic material enclosed between two protective blocks together constituting the body of the magnetic head. Each protective block consists of a magnetic and a non-magnetic part, the latter extending from the boundary surface of the two parts up to the contact surface between the main pole and the magnetic recording medium. Channels provided at the boundary surface in the magnetic parts of the protective blocks cause a part constituting an auxiliary magnetic pole and adjoining the main magnetic pole to be separated from parts constituting return paths for the magnetic flux from the main pole, a winding being wound around the magnetic auxiliary pole through the channels.

However, the previously proposed magnetic head has a number of drawbacks which are predominantly in the field of manufacture (technology). A serious drawback is that the head is built up of two pieces of material, each assembled from two parts using bonding techniques. Bonding between the non-magnetic upper blocks and the magnetic (ferrite) lower blocks sometimes poses problems, because great forces arise in the material and in the bonding surfaces during sawing and/or polishing of these assembles.

A further magnetic head for vertical recording is known from the aforementioned DE-A-3421083. In this magnetic head, which also comprises a main magnetic pole formed as a thin film and two protective blocks provided on either side thereof consisting of a magnetic and a non-magnetic part, channels provided in the magnetipart cause a separation in each protective block between a part located near the main magnetic pole and constituting an auxiliary magnetic pole, and a part constituting the return path for the magnetic flux from the main pole. An electromagnetic coil accommodated in the channels is provided around the assembly of main pole and auxiliary poles. The thin film is provided on a side face of an assembly of one magnetic and one non-magnetic part of the magnetic head.

After polishing such a face, a step can sometimes be formed in the surface. This is because polishing is not necessarily optimized for the two different materials. When the pole film, for example, NiFe is provided on this polished surface, this step may produce an interrupted pole. Moreover, this step is sometimes fatal to the bonding of the non-magnetic upper block and the magnetic lower block due to the forces exerted during bonding of the two core halves. Moreover, it is very disadvantageous to have to apply the pole film on an assembly of two different substrate materials due to the high quality of the film required (high $\mu$hd r and $B_s$).

SUMMARY OF THE INVENTION

The second protecting block consists entirely of a non-magnetic material which extends up to the contact surface between the main pole and the magnetic recording medium and which has a polished surface facing the first protective block, the main pole being provided on the polished surface.

A channel may be provided in the side of the other protective block remote from the one protective block, the winding being wound in said groove.

An advantage of the construction is that the thin film of magnetic material constituting the main pole can be provided on a uniform, stepless substrate surface. Since this substrate consists of a non-magnetic material, the properties of the magnetic film can also be checked after this film has been applied. This is hardly possible if the substrate consists of a magnetic material, such as ferrite.

A further advantage of the construction of the magnetic head according to the invention is that one of the protective blocks of the head is a single part instead of an assembly of two parts. The construction as a whole is therefore mechanically much stronger and can resist greater forces, both during manufacture and during use. Embodiments of the invention will now be described with reference to the drawings, in which:

BRIEF DESCRIPTION OF THE DRAWING

FIGS. 2-7 show the manufacture of the magnetic head of FIG. 1 in perspective views, and FIG. 8 is a schematic view of a second embodiment of the magnetic head according to the invention.

DETAILED DESCRIPTION OF THE PREFERRED EMBODIMENTS

Figure 1:
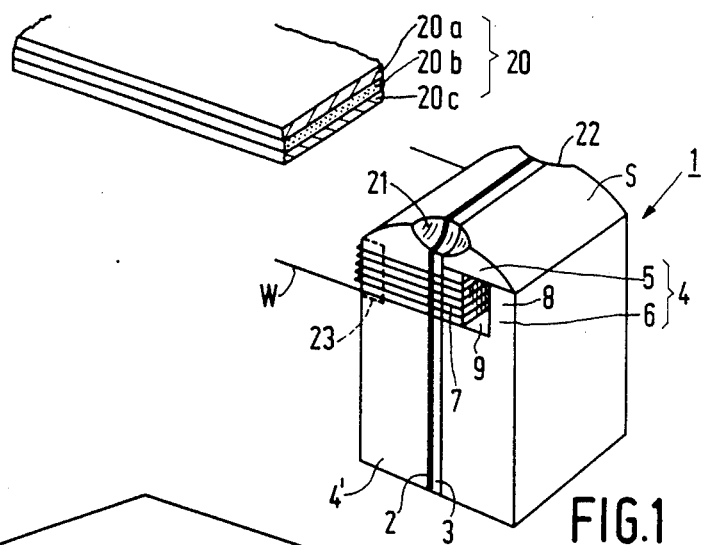
FIG. 1 is a schematic view of a first embodiment of a magnetic head according to the invention.

FIG. 1 shows magnetic head 1 having a magnetic main pole 2 of a thin film of soft magnetic material, having a bonding layer 3 on one side, and enclosed between two protective blocks 4, 4' which constitute the body of the magnetic head. The first protective block 4 consists of a part 6 of a magnetic material and of a part 5 of a non-magnetic material which extends from the boundary surface between the two parts up to the contact surface of the main pole 2 with a magnetic recording medium 20. An auxiliary magnetic pole 7, facing the main pole 2, is formed in the part 6 of the magnetic material. Furthermore there is a channel 9 in the magnetic material next to which a part 8 is left for the return path of the magnetic flux from the main pole 2. A winding W is provided around the main pole 2 and the auxiliary pole 7 via the channel 9.

A method of manufacturing this magnetic head is described with reference to FIGS. 2–7.

Figure 2:
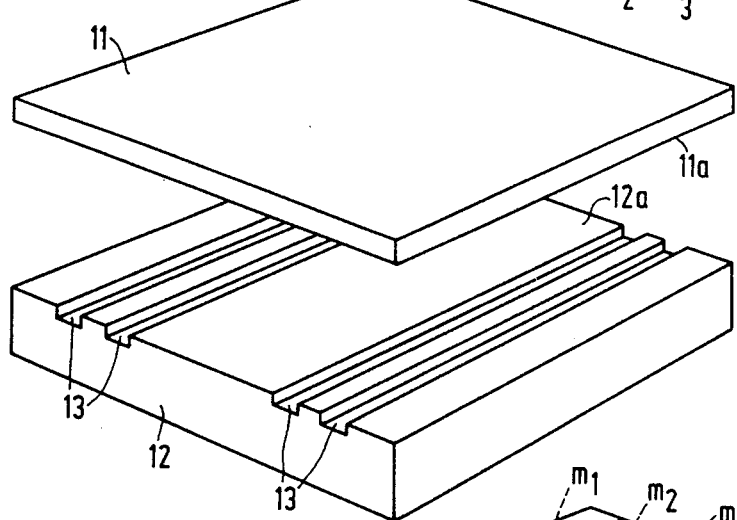
Figure 3:
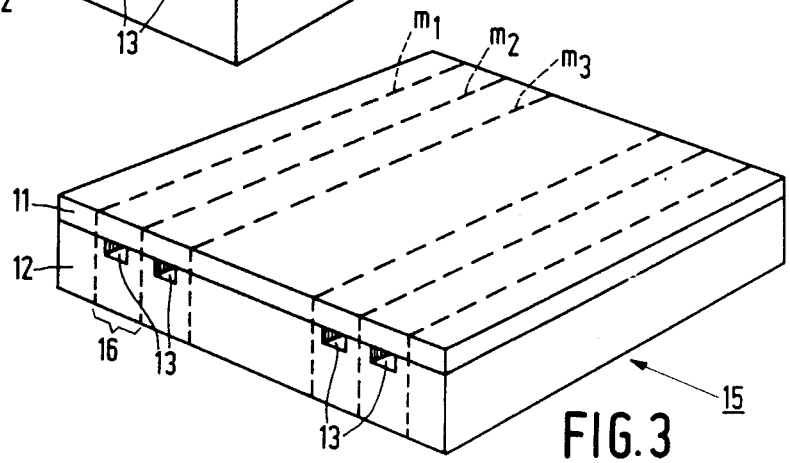

Firstly, a plate 11 of a non-magnetic material and a block 12 of a magnetic material are obtained (FIG. 2). The plate 11 may consist of non-magnetic ferrite (zinc ferrite), forsterite, photoceram, crystal glass, barium titanate, calcium titanate, ceramic materials of the system $Al_2O_3$-TiC and the like. On the other hand the block 12 may be formed from a manganese zinc ferrite, a nickel zinc ferrite or the like. It is desirable for the plate 11 and the block 12 to have substantially equal thermal coefficients of expansion, so they are preferably made from a non-magnetic ferrite and a magnetic ferrite. The surfaces of the plate 11 and the block 12 are mirror-finished by polishing. Subsequently channels 13 are provided at a distance from each other in the mirror-finished surface 12a of the block 12 and then the mirror-finished surface 11a of the plate 11 is bonded to the mirror-finished surface 12a of the block 12. (FIG. 3). Bonding may be effected with the aid of molten glass, an adhesive epoxy resin, or a metallic material such as Au. Since molten glass is sometimes also used at a later stage in the manufacturing process, glass having a high melting point is used the first time so that it does not melt the second time. The assembly 15 of the components 11 and 12 is subsequently sawn, transversely to the plate 11, along the broken lines $m_1, m_2, m_3, ...$ , so that a plurality of plate-shaped parts 16 of predetermined thickness is formed. Each of these parts constitutes a first protective block 4. Subsequently a block 16' of a non-magnetic material is provided and a main surface 16a' of the part 16' is mirror-finished by polishing. The block 16' may consist of, for example, quartz, Si, glass, glass ceramic material, $Al_2O_3$ or GGG.

A thin film 17 of soft magnetic material is provided on the mirror-finished surface 16a' of the part 16 for the purpose of constituting the main magnetic pole 2. The film 17 has a thickness of 0.1 to 3μm. This film may consist of permalloy, a sendust alloy, an amorphous magnetic alloy or the like and may be provided by cathode sputtering, vacuum deposition, ion plattering or the like. The magnetic film 17 may possibly be subjected to a photo-lithographic treatment to obtain a plurality of main magnetic poles 2 having the desired track width. Subsequently an insulating protective film (not shown), for example, of $SiO_2$, $Si_3N_4$, $Al_2O_3$ or the like may be provided on the magnetic film 17 by means of cathode sputtering vacuum deposition, ion plattering or the like. The part 16 with the plate-shaped part 16', which is to constitute the second protective block 4' are then bonded together to form an assembly. Glass is suitable as a bonding material 19, although metallic bonding materials such as Au (via thermocompression bonding) and organic bonding materials such as epoxy resins may alternatively be used (FIG. 5).

The upper surface of the assembly consisting partly of the original surface of the plate 11, is polished in such a manner that a satisfactory contact surface S for the magnetic recording medium is formed and also so that the free height L of the main pole 27 is adjusted. This height may be 10 μm or less. The assembly obtained is subsequently sawn transversely to the magnetic film 17 along the broken lines $n_1, n_2, ...$ (FIG. 6). A configuration is then obtained (FIG. 7) in which the main magnetic pole extends from the film 17 up to the contact surface S, while non-magnetic parts 16' and 11 are located on either side of the upper part of the main pole 2 and a magnetic part 12 is located behind this pole. Subsequently a winding W is inserted through the channel 13 and wound around the assembly of main pole and auxiliary pole to constitute a magnetic head 1 as shown in FIG. 1.

An alternative method is characterized in that a block 12 without channels is used. The aperture for the winding W (denoted by the reference numeral 9 in FIG. 1) is then separately provided in each magnetic head core. FIG. 1 also shows recesses 21, 22 provided in the contact surface S to adjust the track width of the head 1. Both the aperture 9 and the recesses 21, 22 may be formed quite practically using a laser.

As can be seen in FIG. 1, magnetic flux from the main pole 2 of this magnetic head 1 will first pass through a magnetic recording medium 20 consisting of a magnetic layer 20c, a reinforcing layer 20b of high permeability and a non-magnetic base 20a and then return through the part 6 to the magnetic head 1.

FIG. 1 also shows a channel 23 (shown in a broken line). The winding W may alternatively be wound through the channel 23 instead of around the outside of block 4.

Since the magnetic head 1 according to the invention comprises approximately fifty percent less magnetic material than the previously proposed magnetic head for vertical recording, it is to be expected that it will cause less noise (referred to as spike-noise) when reading information from a recording medium 20. Spike noise is attributed to the movement of domain walls in the non-magnetic layer 20b under the influence of the magnetic material of the head.

FIG. 8 shows an alternative embodiment 23 of the magnetic head according to the invention. This head is also built up of a non-magnetic block 24' consisting of one part and a block 24 consisting of a magnetic part 26 and a non-magnetic part 25. In this case the part 25 is at an angle to the block 24', which is slightly smaller than the angle in the case of FIG. 1. This provides the possibility of further grinding the contact surface S without the part 25 being loosened. In this way it is possible to even further decrease the free pole height L.

What is claimed is:

1. A magnetic head for use in vertical recording, comprising a contact surface for a magnetic recording medium, a main magnetic pole of a thin film of soft magnetic material extending up to the contact surface and enclosed between a first protective block and a second protective block together constituting the body of the magnetic head, the first protective block consisting of a magnetic part and a non-magnetic part, said parts being juxtaposed at a common boundary, said non-magnetic part extending from the boundary up to the contact surface, a first channel being provided at the boundary in the magnetic part, said first channel separating an auxiliary magnetic pole adjoining the main magnetic pole from a part constituting the return path for the magnetic flux from the main pole, a winding embracing the main pole and the auxiliary pole being wound through said first channel, characterized in that the second protective block consists entirely of a nonmagnetic material which extends up to the contact surface and has a polished surface facing the first protective block, the main pole being provided on the polished surface, the winding further embracing the second protective block.

2. A magnetic head as claimed in claim 1, characterized in that a second channel is provided in the side of the second protective block remote from the first protective block, and that the winding is also wound in the second channel.

* * * * *